(12) United States Patent
Xu et al.

(10) Patent No.: US 12,366,950 B2
(45) Date of Patent: Jul. 22, 2025

(54) PAGE-BASED INTERACTION METHOD AND APPARATUS, ELECTRONIC DEVICE, AND STORAGE MEDIUM (71) Applicant: Beijing Zitiao Network Technology Co., Ltd., Beijing (CN)

(72) Inventors: Han Xu, Beijing (CN); Mengqi Wu, Beijing (CN); Xiaolei Shi, Beijing (CN); Xu Zhong, Beijing (CN); Huan Wang, Beijing (CN); Shuo Wang, Beijing (CN); Ji Liu, Beijing (CN); Zhiquan Zhang, Beijing (CN); Zhiyong Luo, Beijing (CN); Jia Liu, Beijing (CN); Chengkai Peng, Beijing (CN); Yongkang Chen, Beijing (CN); Ziqi Liu, Beijing (CN); Jialong Zhao, Beijing (CN); Yirui Cao, Beijing (CN); Lei Jin, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/360,227

(22) Filed: Jul. 27, 2023

(65) Prior Publication Data
US 2023/0367456 A1    Nov. 16, 2023

Related U.S. Application Data (63) Continuation of application No. PCT/CN2022/073633, filed on Jan. 25, 2022.

(30) Foreign Application Priority Data

Jan. 27, 2021 (CN) .......................... 202110113638.6

(51) Int. Cl.
G06F 3/0483 (2013.01)
G06F 3/0487 (2013.01)
G06T 13/00 (2011.01)

(52) U.S. Cl.
CPC .......... G06F 3/0483 (2013.01); G06F 3/0487 (2013.01); G06T 13/00 (2013.01)

(58) Field of Classification Search
CPC .... G06F 3/0483; G06F 3/0487; G06F 1/1694; G06F 3/017; G06F 3/04845; G06F 9/451;
(Continued)

(56) References Cited

U.S. PATENT DOCUMENTS 8,504,925 B1 * 8/2013 Haase ................... G06F 3/0481
715/768
8,548,848 B1 * 10/2013 Shaw ................. G06Q 30/0276
705/14.1

(Continued)

FOREIGN PATENT DOCUMENTS

CN    105933730 A    9/2016
CN    105955582 A    9/2016
(Continued)

OTHER PUBLICATIONS

International Search Report mailed Apr. 14, 2022 in International Application No. PCT/CN2022/073633, English translation (6 pages).
(Continued)

Primary Examiner — Daniel W Parcher (57) ABSTRACT

Provided are an interaction method and apparatus, an electronic device, and a storage medium. The method includes displaying a target page, where target content containing a target object is displayed in the target page; receiving a shake trigger operation of a user; and in response to the shake trigger operation, displaying associated content of the target content in a layer above the target page and displaying
(Continued)

the detail page of the target object after completing displaying the associated content.

4 Claims, 7 Drawing Sheets

(58) Field of Classification Search
CPC .............. G06T 13/00; G06Q 30/0241; G06Q 30/0257; G06Q 30/0267; G06Q 30/0631
See application file for complete search history.

(56) References Cited

U.S. PATENT DOCUMENTS

| | | | |
|---|---|---|---|
| 10,327,026 B1* | 6/2019 | Mishra | H04N 21/2668 |
| 10,664,148 B2* | 5/2020 | Matas | G06F 3/04847 |
| 10,769,701 B1* | 9/2020 | Winer | G06F 3/0346 |
| 2008/0288983 A1* | 11/2008 | Johnson | H04N 21/812 |
| | | | 725/46 |
| 2011/0112914 A1* | 5/2011 | Geer, III | G06Q 30/00 |
| | | | 705/14.73 |
| 2011/0264491 A1* | 10/2011 | Birnbaum | G06F 9/451 |
| | | | 715/702 |
| 2012/0166294 A1* | 6/2012 | Lieberman | G06Q 30/0276 |
| | | | 705/14.72 |
| 2013/0088648 A1 | 4/2013 | Yoon et al. | |
| 2014/0143070 A1* | 5/2014 | DeVree | H04N 21/47217 |
| | | | 705/14.73 |
| 2015/0186944 A1* | 7/2015 | Forsblom | G06F 3/04842 |
| | | | 705/14.64 |
| 2015/0379160 A1* | 12/2015 | Avraham | G06F 3/0484 |
| | | | 715/767 |
| 2016/0334973 A1* | 11/2016 | Reckhow | H04N 21/4312 |
| 2018/0262812 A1* | 9/2018 | Chai | H04N 21/4383 |
| 2018/0315076 A1 | 11/2018 | Andreou | |
| 2019/0073106 A1* | 3/2019 | Zhou | G06F 3/04883 |
| 2019/0230311 A1* | 7/2019 | He | H04N 21/426 |

FOREIGN PATENT DOCUMENTS

| | | | |
|---|---|---|---|
| CN | 108255562 A | | 7/2018 |
| CN | 109754298 A | | 5/2019 |
| CN | 110134484 A | | 8/2019 |
| CN | 111031375 A | | 4/2020 |
| CN | 111752639 A | | 10/2020 |
| CN | 112783591 A | | 5/2021 |
| JP | 2013-134494 A | | 7/2013 |
| JP | 57-049820 B1 | | 7/2015 |
| JP | 65-017388 B1 | | 5/2019 |
| WO | 2018138664 A1 | | 8/2018 |

OTHER PUBLICATIONS

Notice of Rejection issued Apr. 29, 2023 in Chinese Application No. 202110113638.6, English translation (15 pages).
First Office Action issued Dec. 14, 2022 in Chinese Application No. 202110113638.6, English translation (14 pages).
Second Office Action issued Feb. 24, 2023 in Chinese Application No. 202110113638.6, English translation (15 pages).
"What's the magic of Watermelon video 'One Shot to the Bottom'? How to bring more imaginative space to brand marketing," available at https://m.sohu.com/a/322721676_535321/?Pvid=0001153wa&scm=1002.0.0.0-0, published Jun. 24, 2019, English translation (20 pages).
Office action received from Japanese patent application No. 2023-545191 mailed on Aug. 27, 2024, 6 pages (3 pages English Translation and 3 pages Original Copy).
European Search Report for EP Patent Application No. 22745210.9, Issued on May 23, 2024, 4 pages.
International Search Report for International Application No. PCT/CN2021/117199, mailed Dec. 17, 2021, 5 pages.
Written Opinion for International Application No. PCT/CN2022/073633, mailed Apr. 14, 2022, 10 Pages.
European Office Action for EP Patent Application No. 22745210, Issued on Jan. 3, 2025, 4 pages.
Office Action received for European Application No. 22745210, mailed on Jul. 3, 2024, 6 pages.
Office action received from Japanese patent application No. 2023-545191 mailed on Dec. 3, 2024, 6 pages (3 pages English Translation and 3 pages Original Copy).

* cited by examiner

PAGE-BASED INTERACTION METHOD AND APPARATUS, ELECTRONIC DEVICE, AND STORAGE MEDIUM

CROSS-REFERENCES TO RELATED APPLICATIONS

This application is a continuation of International Patent Application No. PCT/CN2022/073633, filed on Jan. 25, 2022, which claims priority to Chinese Patent Application No. 202110113638.6 filed with the China National Intellectual Property Administration (CNIPA) on Jan. 27, 2021, the disclosures of which are incorporated herein by reference in their entireties.

TECHNICAL FIELD

The present disclosure relates to the field of interaction techniques, for example, an interaction method and apparatus, an electronic device, and a storage medium.

BACKGROUND

When a client is started, usually a splash page is displayed, and corresponding splash content is displayed in the splash page. For example, a preset splash picture is displayed in the splash page, or a preset splash video is played in the splash page.

However, the display mode of a splash page in the related art is poor in interactivity, resulting in a poor user experience when the user views the splash content.

SUMMARY

The present disclosure provides an interaction method and apparatus, an electronic device, and a storage medium to enhance the interactivity of splash content and improve the viewing experience of a user.

An embodiment of the present disclosure provides an interaction method. The method includes displaying a target page, where target content containing a target object is displayed in the target page; receiving a shake trigger operation of a user; and in response to the shake trigger operation, displaying associated content of the target content in the layer above the target page and displaying the detail page of the target object after completing displaying the associated content.

An embodiment of the present disclosure provides an interaction apparatus. The apparatus includes a target page display module, a shake receiving module, and a detail page display module.

The target page display module is configured to display a target page, where target content containing a target object is displayed in the target page.

The shake receiving module is configured to receive a shake trigger operation of a user.

The detail page display module is configured to, in response to the shake trigger operation, display associated content of the target content in the layer above the target page and display the detail page of the target object after completing displaying the associated content.

An embodiment of the present disclosure provides an electronic device. The electronic device includes at least one processor and a memory configured to store at least one program.

The at least one program, when executed by the at least one processor, causes the at least one processor to perform the interaction method of any embodiment of the present disclosure.

An embodiment of the present disclosure provides a computer-readable storage medium storing a computer program which, when executed by a processor, causes the processor to perform the interaction method of any embodiment of the present disclosure.

DETAILED DESCRIPTION

Embodiments of the present disclosure are described hereinafter with reference to the drawings. The drawings illustrate some embodiments of the present disclosure, but the present disclosure may be implemented in various manners and should not be construed as limited to the embodiments set forth herein. The drawings and embodiments of the present disclosure are illustrative and are not intended to limit the scope of the present disclosure.

The various steps recited in method embodiments of the present disclosure may be performed in a different order and/or in parallel. Additionally, the method embodiments may include additional steps and/or omit the steps shown. The scope of the present disclosure is not limited in this respect.

The term "includes" or its variant used herein means "includes, but is not limited to". The term "based on" used herein means "at least partially based on". The term "an embodiment" used herein means "at least an embodiment". The term "another embodiment" used herein means "at least another embodiment". The term "some embodiments" used herein means "at least some embodiments". Related definitions of other terms are given in the description hereinafter.

Concepts such as "first" and "second" in the present disclosure are intended to distinguish between apparatuses, modules, or units and are not intended to limit the order of or interdependence between functions performed by these apparatuses, modules, or units.

"One" or "multiple" in the present disclosure is illustrative and non-limiting and is interpreted as "one or more" unless otherwise specified in the context.

The names of messages or information exchanged between apparatuses in embodiments of the present disclosure are illustrative and not to limit the scope of the messages or information.

Figure 1:
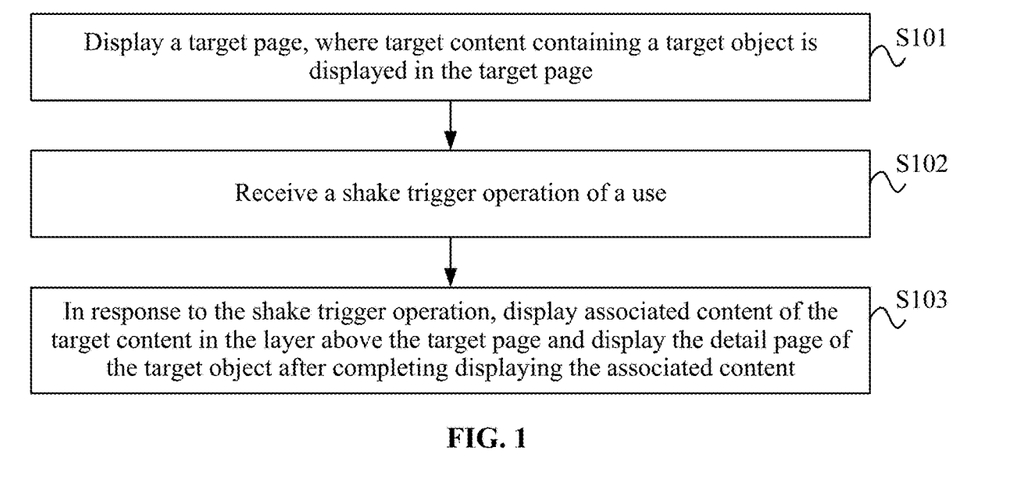
FIG. 1 is a flowchart of an interaction method according to an embodiment of the present disclosure.

FIG. 1 is a flowchart of an interaction method according to an embodiment of the present disclosure. The method may be performed by an interaction apparatus. The apparatus may be implemented by software and/or hardware and may be configured in an electronic device such as a mobile phone or a tablet computer. The interaction method of this embodiment of the present disclosure is applicable to the scenario where splash content is displayed or the scenario where a video containing the same object as the splash content is played. As shown in FIG. 1, the interaction method of this embodiment may include S101, S102, and S103.

In S101, a target page is displayed, where target content containing a target object is displayed in the target page.

The target object may be a to-be-recommended object, for example, a to-be-recommended virtual or non-virtual object. The target content may be understood as the recommendation content of the target object, for example, the advertising content of an item set by a developer or the recommendation information of an item uploaded by a user. The format of the target content may include a picture (including a still picture or a moving picture) and/or a video. In the following example, the target content is advertising content. The target page may be a page displaying the target content, for example, any page displaying advertising content. The target page may include a splash page and/or a video play page. The splash page may be understood as a page displayed when an application is started. The video play page may be understood as a video play page that is playing a recommendation video containing the target object, for example, a video play page that is playing an advertising video.

Figure 2:
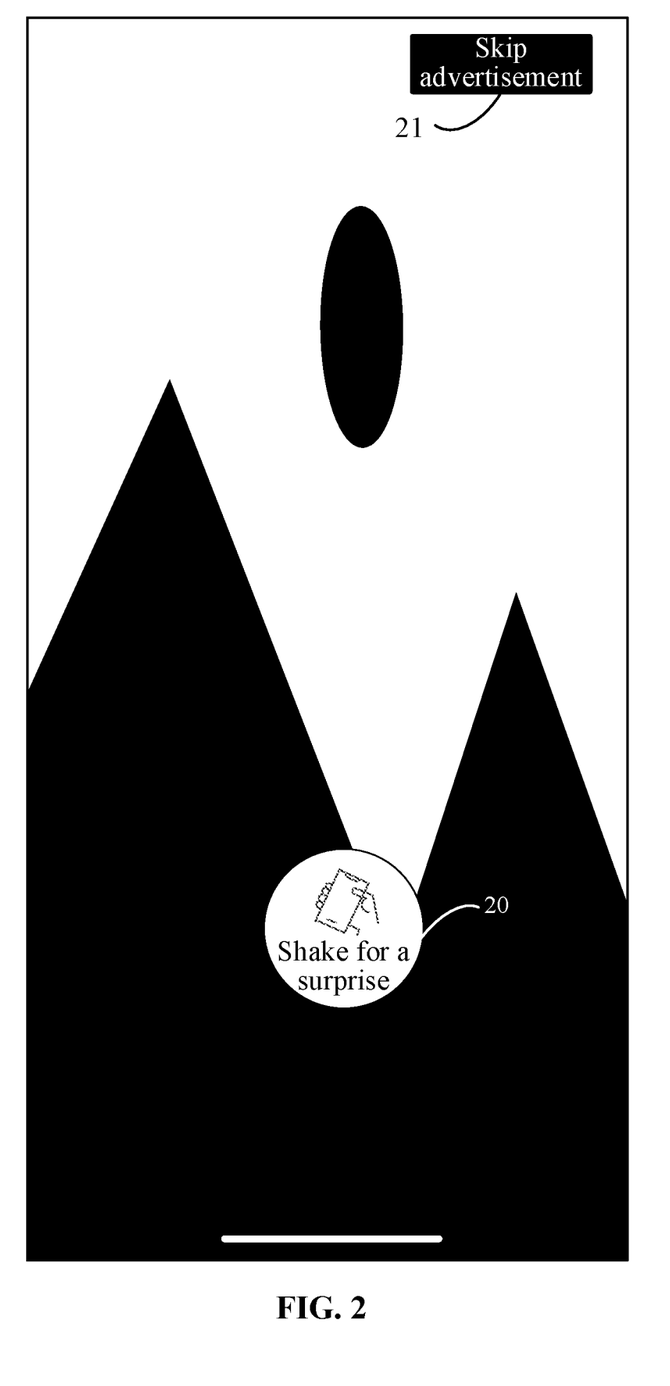
FIG. 2 is a diagram of a splash page according to an embodiment of the present disclosure.

The electronic device displays the target page based on the trigger operation of the user and displays the target content containing the target object in the target page. For example, the electronic device may display the splash page and display the preset advertising content in the splash page during the startup of the corresponding application or after the startup of the application is completed, as shown in FIG. 2. Alternatively, the video may be played in the video play page based on the corresponding trigger operation of the user, and when an advertising video or a particular advertising video (such as an advertising video provided with associated content) is played, as shown in FIG. 3, subsequent steps are performed based on the shake trigger operation of the user.

In this embodiment, as shown in FIG. 2, when a splash advertisement is displayed in the splash page, shake prompt information 20 may be displayed in the splash page to remind the user that more interactions can be performed after the user performs a shake trigger operation. Additionally, a jump control 21 may be configured in the splash page so that the user can click the jump control 21 to instruct the electronic device to stop displaying the splash page and enter the home page, for example, the video play page, of the application. Alternatively, the electronic device may automatically switch the current display page from the splash page to the home page of the application when the advertising video in the splash page completes being played (in the scenario where the target content displayed in the splash page is a video) or when the advertising picture in the splash page has been displayed for a preset time length (in the scenario where the target content displayed in the splash page is a picture). The user may also click the non-control region (for example, the display region of the target content) of the splash page to instruct the electronic device to switch the current display page to the detail page of the target object.

Figure 3:
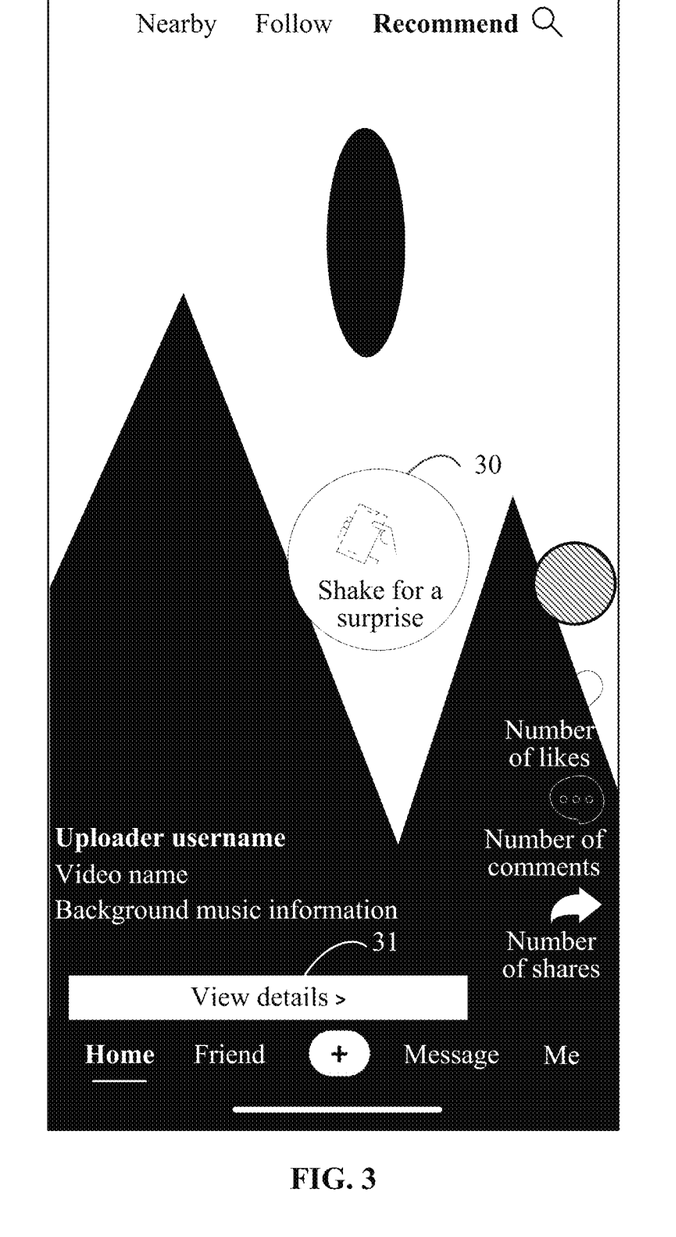
FIG. 3 is a diagram of a video play page according to an embodiment of the present disclosure.

As shown in FIG. 3, when the recommendation video of the target object is played in the video play page, for example, when the advertising video of the target object is played in the video play page, shake prompt information 30 may be displayed in the video play page to remind the user to perform the shake trigger operation to perform more interactions. Additionally, a detail viewing control 31 may also be displayed in the video play page so that the user can click the detail viewing control 31 to instruct the electronic device to switch the current display page from the video play page to the detail page of the target object so that the user can view details about the target object.

In an embodiment, the target page includes the video play page, the target content is a target video, and before displaying the target page, the method also includes displaying the splash page and displaying splash content containing the target object in the splash page; and displaying the target page includes, in response to completing displaying the splash content or in response to receiving a first trigger operation acting on a jump control in the splash page, switching the current display page from the splash page to the video play page and playing the target video containing the target object in the video play page.

In this embodiment, the electronic device may provide the interaction mode of shake when playing the target video of the splash content. The target video may be a video containing the same object as the splash content, for example, a video corresponding to the same item as a splash advertisement. This video may be played when the home page (for example, the video play page) of the application is entered. The first trigger operation may be understood as an operation of triggering the jump control in the splash page, for example, a click operation acting on the jump control in the splash page.

For example, the home page of the application is the video play page. When the electronic device starts the corresponding application or after the electronic device completes starting the corresponding application, the electronic device displays the splash page and displays the target content containing the target object in the splash page, for example, displays an advertising picture of the target object in the splash page or plays an advertising video of the target object in the splash page. The user can view the target content presented in the splash page and can click the jump control in the splash page when the user wants to skip the target content to enter the video play page of the application. Accordingly, the electronic device may, when detecting that the user triggers the jump control in the splash page, determine that the first trigger operation is received, switch the current display page from the splash page to the home page of the application, set the target video of the target object as the first video in the video stream of the home page, and play the first video in the home page. Alternatively, the electronic device may, when completing displaying the target video, switch the current display page from the splash page to the home page of the application, set the target video of the target object as the first video in the video stream of the home page, and play the first video in the home page. In this manner, when the user does not want to view the target video, the user can perform the corresponding video switching operation, for example, up-and-down slide operation, to instruct the electronic device to switch the video played in the home page.

In another embodiment, the electronic device may provide the user with the interaction mode of shake when displaying the splash content. At this time, when completing playing the splash content or when receiving the first trigger operation acting on the jump control in the splash page, the electronic device may switch the current display page from the splash page to the home page of the application and play a video including or not including the target object in the home page. Playing a video not including the target object in the home page means setting the first video in the video stream of the home page as a non-recommendation video of the target object, preventing the user from continuously viewing the advertising content and improving the viewing experience of the user.

In S102, a shake trigger operation of a user is received.

The shake trigger operation may be understood as a shake operation that acts on the electronic device, whose shake amplitude is greater than or equal to a preset angle value, whose number of times of consecutive shakes is greater than or equal to a preset number, and whose time interval between two adjacent shakes is less than or equal to a preset time interval. The preset angle, the preset number of times, and the preset time interval may be set by a developer according to requirements. For example, the preset angle value may be set to 20° or 30°, the preset number of times may be set to 2 or 3, and the preset time interval may be set to 0.5 s or 1s. This is not limited by this embodiment.

The electronic device displays the target content in the target page. When the user wants to view the associated content of the target content displayed in the target page, the user may shake the electronic device, that is, perform the shake trigger operation. Accordingly, the electronic device may receive the shake trigger operation of the user and perform S103.

In S103, in response to the shake trigger operation, associated content of the target content is displayed in the layer above the target page, and the detail page of the target object is displayed after the associated content completes being displayed.

The associated content of the target content may be, for example, a special effect associated with the target object (that is, an associated special effect) or a video associated with the target object (that is, an associated video). The associated content of the target content may be set in advance by a developer according to requirements. The associated effect may or may not contain a visual element associated with the target object. The detail page of the target object may be a page displaying detailed information of the target object. When the target object is an item corresponding to the advertising content, the detail page may be the purchase page of the item so that the user can view the detailed information of the corresponding item and make a purchase. The detail page may be a page set in the application or set in another application. When the detail page is a page in another application, the application may display the detail page of the target object by calling the other application.

Illustratively, the electronic device may, when detecting the shake trigger operation of the user, continue displaying the target content in the target page and display the associated content of the target content in the layer above the target page, for example, display the associated special effect of the target object in the layer above the target page or play the associated video of the target object in the layer above the target object; and when completing displaying the associated special effect (for example, displaying the associated special effect for a preset time length) or when completing playing the associated video, stop displaying the associated special effect/associated video and display the detail page of the target object so that the user can view the related information of the target object.

In this embodiment, the occasion when the electronic device switches the target page to the detail page of the target object may be set according to requirements. For example, the electronic device may switch the target page in the layer under the associated content to the detail page of the target object when the electronic device starts to display the associated content of the target content. Alternatively, the electronic device may switch the target page to the detail page of the target object when completing displaying the associated content, that is, when stopping displaying the associated content. Alternatively, the electronic device may switch the target page in the layer under the associated content to the detail page of the target object in the process that the associated content is being displayed, for example, when the associated content completely overwrites the target page.

In an embodiment, the electronic device may switch the target page to the detail page of the target object in the process of displaying the associated content. In this case, displaying the associated content of the target content in the layer above the target page and displaying the detail page of the target object after completing displaying the associated content may include displaying the associated content of the target content in the layer above the target page and switching the target page to the detail page of the target object in the process of displaying the associated content; and in response to completing displaying the associated content, stopping displaying the associated content to display the detail page in the layer under the associated content.

Illustratively, the electronic device may, when receiving the shake trigger operation of the user, in response to the shake trigger operation, display the associated content of the target content in the layer above the target page, for example, display the associated special effect of the target object or play the associated video of the target object in the layer above the target page; in the process of displaying the associated special effect or playing the associated video, switch the target page in the layer under the associated special effect/associated video to the detail page of the target object; and when completing displaying the associated special effect or when completing playing the associated video, stop displaying the associated special effect/associated video in the layer above the target page to show the user the detail page of the target object in the layer under the associated special effect/associated video.

In an embodiment, after displaying the associated content of the target content in the layer above the target page, the method also includes, in response to receiving a second trigger operation acting on the associated content, displaying the detail page of the target object.

The second trigger operation may be understood as a trigger operation acting on the display region of the associated content, for example, a click operation acting on the display region of the associated content.

In this embodiment, when the user want to view the detail page of the target object before the display of the associated content is completed, the user may click the display region of the associated content, for example, click the associated content displayed by the electronic device. Accordingly, when detecting the click operation acting on the display region of the associated content, the electronic device may determine that the second trigger operation is received, stop displaying the associated content, and display the detail page of the target object so that the user can view the detailed information of the target object, thereby avoiding the situation where the user can view the detail page of the target object only after waiting for the associated content to complete being displayed, reducing the waiting time of the user, and improving the user experience.

The interaction method of this embodiment includes displaying a target page, where target content containing a target object is displayed in the target page; receiving a shake trigger operation of a user; and in response to the shake trigger operation, displaying associated content of the target content in the layer above the target page and displaying the detail page of the target object after completing displaying the associated content. The solution of this embodiment enables the user to use the shake trigger operation to instruct the electronic device to display the associated content of the target content displayed in the target page and jump to the detail page of the target object, better improving the interestingness in displaying the target content of the target object and the associated content and improving the user's interest in the target object and the user experience.

Figure 4:
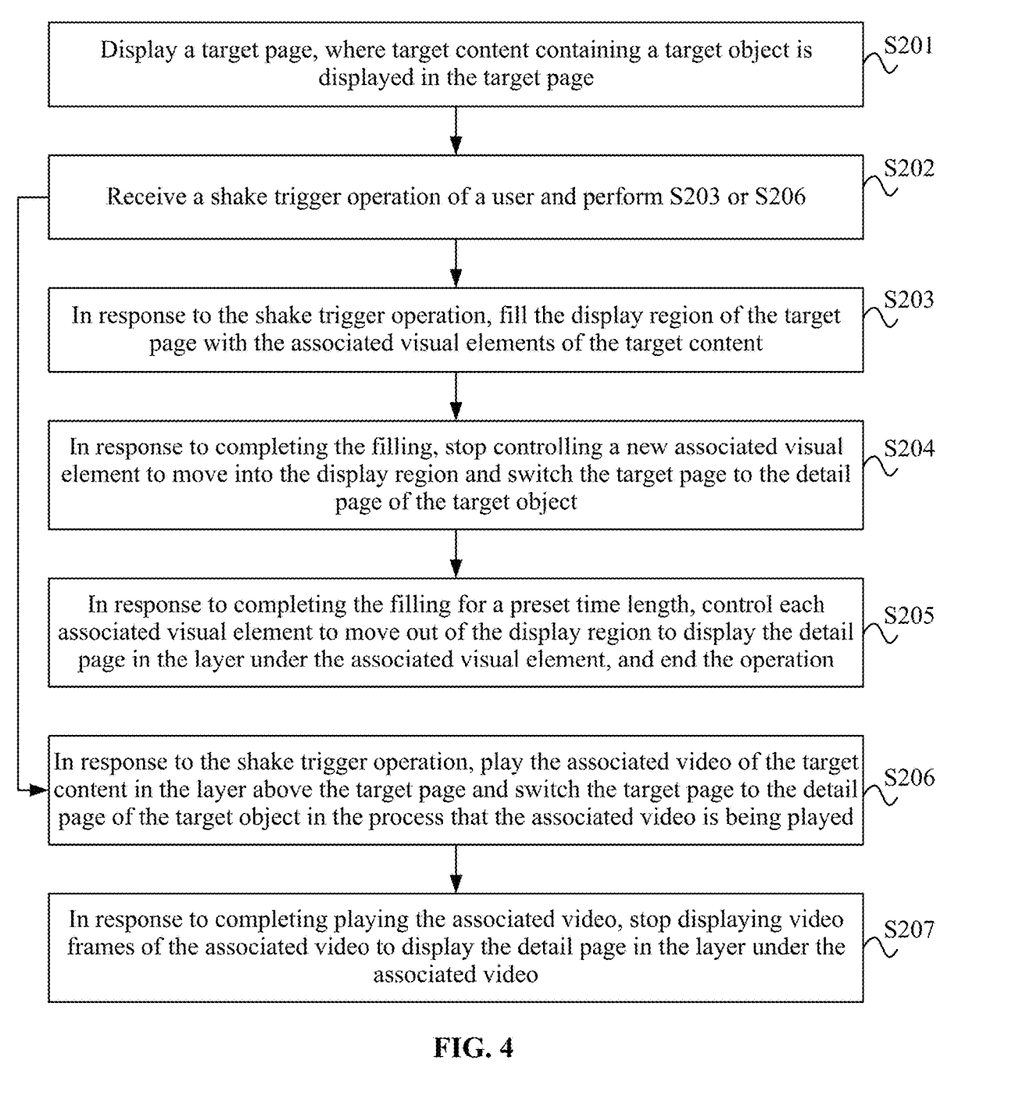
FIG. 4 is a flowchart of another interaction method according to an embodiment of the present disclosure.

FIG. 4 is a flowchart of another interaction method according to an embodiment of the present disclosure. The solution of this embodiment may be combined with one or more of the alternatives of the previous embodiments. Alternatively, the associated content includes multiple associated visual elements, and displaying the associated content of the target content in the layer above the target page and switching the target page to the detail page of the target object in the process of displaying the associated content includes filling the display region of the target page with the associated visual elements of the target content; and in response to completing the filling, stopping controlling a new associated visual element to move into the display region and switching the target page to the detail page of the target object.

Alternatively, in response to completing displaying the associated content, stopping displaying the associated content to display the detail page in the layer under the associated content includes, in response to completing the filling for a preset time length, controlling each associated visual element to move out of the display region to display the detail page in the layer under the associated visual elements.

Alternatively, the associated content includes an associated video, and displaying the associated content of the target content in the layer above the target page and switching the target page to the detail page of the target object in the process of displaying the associated content includes playing the associated video of the target content in the layer above the target page and switching the target page to the detail page of the target object in the process of playing the associated video; and in response to completing displaying the associated content, stopping displaying the associated content to display the detail page in the layer under the associated content includes, in response to completing playing the associated video, stopping displaying video frames of the associated video to display the detail page in the layer under the associated video.

As shown in FIG. 4, the interaction method of this embodiment includes S201, S202, S203, S204, S205, S206, and S207.

In S201, a target page is displayed, where target content containing a target object is displayed in the target page.

In S202, a shake trigger operation of a user is received, and S203 or S206 is performed.

In S203, in response to the shake trigger operation, the display region of the target page is filled with the associated visual elements of the target content.

The associated visual elements may be understood as visual elements displayed in the layer above the target page upon the received shake trigger operation of the user when the target content is displayed in the target page. The visual elements may be visual elements associated with the target object contained in the target content or may be visual elements not associated with the target object. The shape of each of the associated visual elements may be set flexibly. For example, the shape of each of the associated data elements may be a painted egg, such as a sphere or may be another regular or irregular shape. This is not limited by this embodiment.

Illustratively, the electronic device may, when receiving the shake trigger operation of the user, acquire the associated content of the target content from a server and may, when the acquired associated content is an associated visual element, fill the display region of the target page with one or more associated visual elements according to a preset filling mode to overwrite the target page displayed on the screen.

In this embodiment, the filling mode of an associated visual element may be set flexibly according to requirements. For example, it is feasible to display an associated visual element at a preset position (for example, the center of the display region of the target page) and control the associated visual element to expand gradually until the associated visual element completely overwrites the display region of the target page. Alternatively, it is feasible to display multiple associated visual elements successively at a preset position or to control multiple associated visual elements successively to move from a preset position into the display region of the target page, control each associated visual element to move towards the region boundary of the display region, and control an associated visual element to stop moving when the associated visual element moves to another set position of the display region (for example, the boundary or another position in the display region) or touches an associated visual element that has stopped moving in the display region until the display region of the target page is full of the associated visual elements. This is not limited by this embodiment.

In an embodiment, filling the display region of the target page with the associated visual elements of the target content includes controlling the associated visual elements of the target content to move from the preset position into the display region of the target page and to continue moving towards the region boundary of the display region until touching the region boundary or until touching an associated visual element that stops moving in the display region.

The preset position may be any position of the display region of the target page, for example, one or more region boundary positions of the display region of the target page; or may be any position in the display region of the target page, for example, the center of the target page or another non-region-boundary position. The moving direction of the associated visual element may be set flexibly. For example, the moving direction of the associated visual element may be from the preset position to the region boundary of the display region of target page. The moving directions of different associated visual elements may be the same or different.

Figure 5:
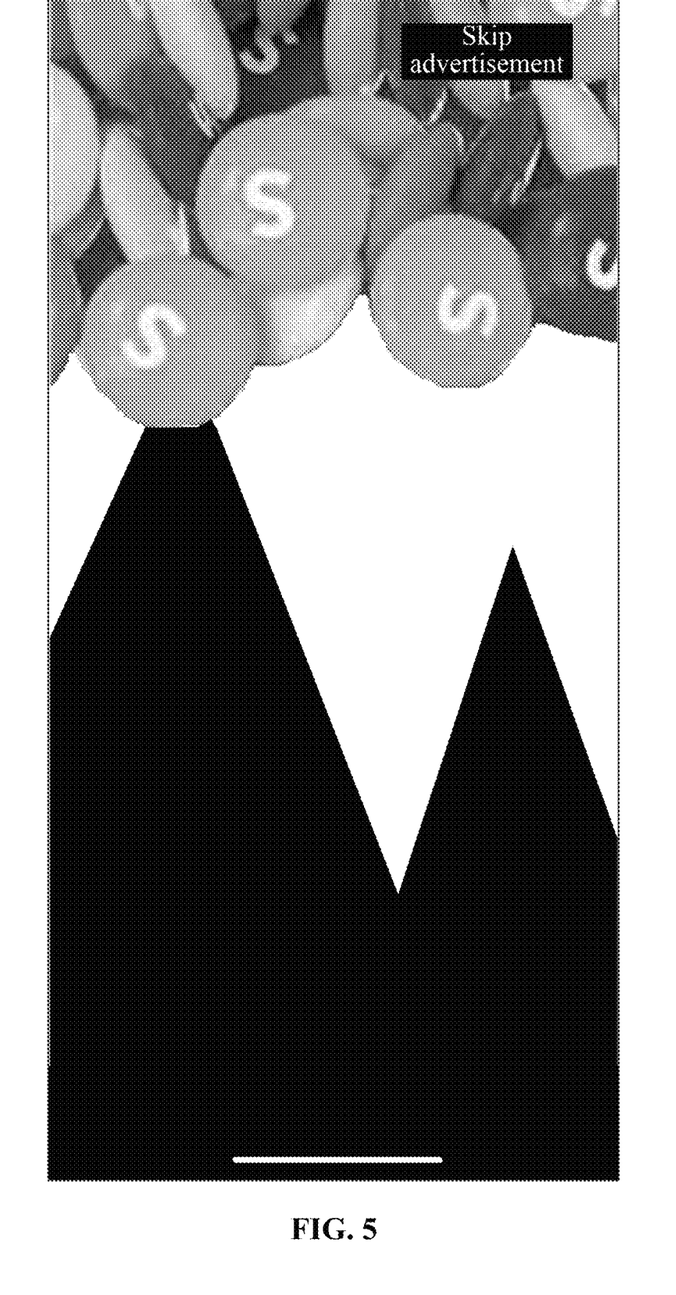
FIG. 5 is a diagram illustrating a manner in which an associated visual element is moved according to an embodiment of the present disclosure.

Illustratively, when receiving the shake trigger operation of the user, the electronic device may control multiple associated visual elements successively to move from one region boundary position of the display region of the target page into the display region and continue moving towards another region boundary position opposite to the one region boundary position, for example, control multiple associated visual elements successively to move downwards from an upper region boundary position of the display region of the target page into the display region and continue moving downwards in the display region until touching a lower region boundary position of the display region or an associated visual element that has stopped moving in the display region. See FIG. 5. (By way of example, FIG. 5 illustrates that the associated visual elements are ellipsoidal and that the target page is a splash page.) Alternatively, the electronic device may control multiple associated visual elements successively to move upwards from a lower region boundary position of the display region of the target page into the display region and continue moving upwards in the display region until touching an upper region boundary position of the display region or an associated visual element that has stopped moving in the display region. Alternatively, the electronic device may control multiple associated visual elements successively to move from a non-region-boundary position of the display region (the center of the display region) of the target page in the display region along different directions and continue moving towards the periphery of the display region until touching a region boundary position of the display region or an associated visual element that has stopped moving in the display region. The number of associated visual elements that move into the display region of the target page at a time may be preset or may be determined randomly. Different associated visual elements may move into the display region of the target page at the same or different speeds. Different associated visual elements may move within the display region of the target page at the same or different speeds.

In S204, in response to completing the filling, a new associated visual element is stopped from being controlled to move into the display region, and the target page is switched to the detail page of the target object.

Figure 6:
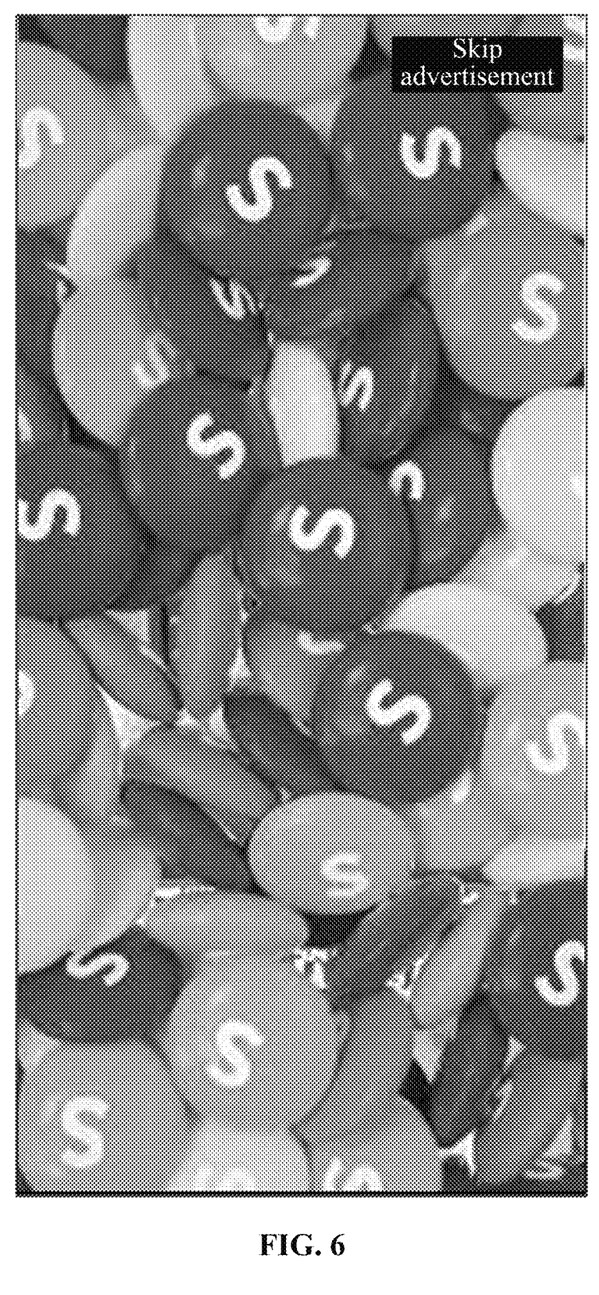
FIG. 6 is a diagram illustrating a manner in which an associated visual element is displayed according to an embodiment of the present disclosure.

In this embodiment, it is feasible to switch the target page to the detail page of the target object after the display region of the target page is full of associated visual elements, weakening user perception of page switching and reducing the abruptness of page switching. When the display region of the target page is full of associated visual elements, as shown in FIG. 6 (FIG. 6 illustrates that the target page is a splash page), that is, when a new associated visual element cannot move into the display region of the target page, it is feasible to stop controlling the new associated visual element to move into the display region and switch the target page in the layer under the associated visual element to the detail page of the target object. When the filling is completed, a new target video element is stopped from being controlled to move into the display region, and the target page is switched to the detail page of the target object.

That the display region of the target page is full of associated visual elements means that the associated visual elements have spread throughout the display region, that is, means that no new associated visual element can be moved in according to the preceding moving mode, and does not require that a gap not covered by an associated visual element is not present in the display region.

In S205, in response to completing the filling for a preset time length, each associated visual element is controlled to move out of the display region so that the detail page in the layer under the associated visual element is displayed, and the operation is ended.

The electronic device may fill the display region of the target page with the associated visual element; after completing the filling, continue displaying the associated visual element for a preset time length; and when reaching the preset time length, control each associated visual element to move out of the display region of the target page to remove the shield on the detail page of the target object displayed in the display region, that is, to show the user the detail page of the target object in the layer under the associated visual element.

The preset time length may be set according to requirements. For example, the preset time length may be set to 1 s or 2 s. The direction in which each associated visual element moves out of the display region may or may not be the same as the direction in which the each associated visual element moves into the display region. It is feasible to control each associated visual element to move out of the display region in the direction in which the each associated visual element moves into the display region. For example, if each associated visual element moves downwards into the display region, the each associated visual element may be controlled to continue moving downwards to move out of the display region after reaching a preset time length. For another example, if each associated visual element moves upwards into the display region, the each associated visual element may be controlled to continue moving upwards to move out of the display region after reaching a preset time length. In this manner, each associated visual element can move in and out more continuously. Different associated visual elements may move at the same speed or at different speeds when moving out of the display region.

In this step, the trigger condition for controlling each associated visual element to move out of the display region may also be set to switching the target page to the detail page of the target object. That is, in the embodiment, it is feasible to control each associated visual element to move out of the display region of the target page after switching the target page to the detail page of the target object.

In S206, in response to the shake trigger operation, the associated video of the target content is played in the layer above the target page, and the target page is switched to the detail page of the target object in the process that the associated video is being played.

In S207, in response to completing playing the associated video, video frames of the associated video are stopped from being displayed so that the detail page in the layer under the associated video is displayed.

The associated video of the target content may be understood as a video containing the target object. When the target content displayed in the target page is a video, the associated video may be a video different from the target content. The associated video may be set by a developer according to requirements.

Illustratively, the electronic device may acquire the associated content of the target content from the server when receiving the shake trigger operation of the user. When the acquired associated content is a video, that is, when the acquired associated content is an associated video, the associated video is played in the layer above the target page. In the process that the associated video is being played, for example, when the associated video is played to a preset time node (for example, the start point of the associated video, a time node between the start point of the associated video and the end point of the associated video, or the end point of the associated video), when the target page in the layer under the played associated video is switched to the detail page of the target object and when the associated video completes being played, the associated video is stopped from being displayed in the layer above the target page, for example, the image layer where the associated video is located is deleted, so that the detail page of the target object located in the layer under the associated video is displayed.

The interaction method of this embodiment includes, in response to receiving a shake trigger operation of a user, displaying an associated visual element or playing an associated video in the layer above a target page; and switching the target page to the detail page of a target object in the process of displaying the associated visual element or playing the associated video, thereby providing the user with more interaction modes and interaction contents, weakening user perception of page switching, improving the continuity of content displayed in the page, and improving the viewing experience of the user.

Figure 7:
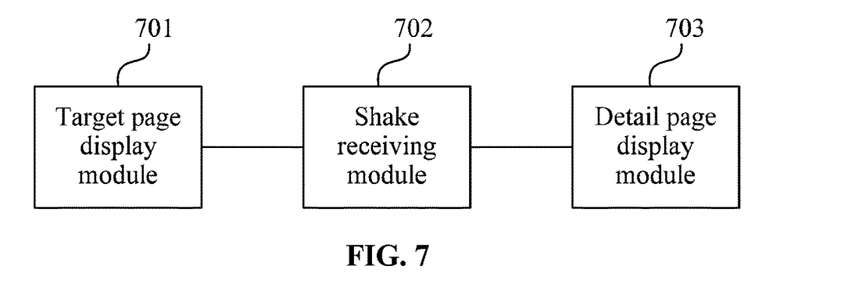
FIG. 7 is a block diagram of an interaction apparatus according to an embodiment of the present disclosure.

FIG. 7 is a block diagram of an interaction apparatus according to an embodiment of the present disclosure. The apparatus may be implemented by software and/or hardware and may be configured in an electronic device such as a mobile phone or a tablet computer. The apparatus can perform an interaction method to perform interaction. As shown in FIG. 7, the interaction apparatus of this embodiment may include a target page display module 701, a shake receiving module 702, and a detail page display module 703.

The target page display module 701 is configured to display a target page, where target content containing a target object is displayed in the target page.

The shake receiving module 702 is configured to receive a shake trigger operation of a user.

The detail page display module 703 is configured to, in response to the shake trigger operation, display associated content of the target content in the layer above the target page and display the detail page of the target object after completing displaying the associated content.

In the interaction apparatus of this embodiment, the target page display module 701 is configured to display a target page, where target content containing a target object is displayed in the target page; the shake receiving module 702 is configured to receive a shake trigger operation of a user; and the detail page display module 703 is configured to, in response to the shake trigger operation, display associated content of the target content in the layer above the target page and display the detail page of the target object after completing displaying the associated content. The solution of this embodiment enables the user to use the shake trigger operation to instruct the electronic device to display the associated content of the target content displayed in the target page and jump to the detail page of the target object, improving the interestingness in displaying the target content of the target object and the associated content and improving the user's interest in the target object and the user experience.

In the solution, the target page may include a splash page and/or a video play page.

The target page may include a video play page. The target content may be a target video. The interaction apparatus of this embodiment may also include a splash page display module configured to, before the target page is displayed, display the splash page and display splash content containing the target object in the splash page. The target page display module 701 may be configured to, in response to completing displaying the splash content or in response to receiving a first trigger operation acting on a jump control in the splash page, switch the current display page from the splash page to the video play page and play the target video containing the target object in the video play page.

In the solution, the detail page display module 703 may include a page switching unit configured to display the associated content of the target content in the layer above the target page and switch the target page to the detail page of the target object in the process of displaying the associated content; and a detail page display unit configured to, in response to completing displaying the associated content, stop displaying the associated content to display the detail page in the layer under the associated content.

In the solution, the associated content includes multiple associated visual elements, and the page switching unit may be configured to fill the display region of the target page with the associated visual elements of the target content; and in response to completing the filling, stop controlling a new associated visual element to move into the display region and switch the target page to the detail page of the target object.

In the solution, the page switching unit may be configured to control the associated visual elements of the target content to move from a preset position into the display region of the target page and to continue moving towards the region boundary of the display region until touching the region boundary or until touching an associated visual element that stops moving in the display region.

In the solution, the detail page display unit may be configured to, in response to completing the filling for a preset time length, control each of the associated visual elements to move out of the display region to display the detail page in the layer under the associated visual elements.

In the solution, the page switching unit may be configured to play the associated video of the target content in the layer above the target page and switch the target page to the detail page of the target object in the process of playing the associated video; and the detail page display unit may be configured to, in response to completing playing the associated video, stop displaying video frames of the associated video to display the detail page in the layer under the associated video.

The interaction apparatus of this embodiment may also include a trigger receiving module configured to, after the associated content of the target content is displayed in the layer above the target page, in response to receiving a second trigger operation acting on the associated content, display the detail page of the target object.

The interaction apparatus of this embodiment of the present disclosure can perform the interaction method of any embodiment of the present disclosure and has function modules and effects corresponding to the performed interaction method. For details not described in detail in this embodiment, see the interaction method of any embodiment of the present disclosure.

Figure 8:
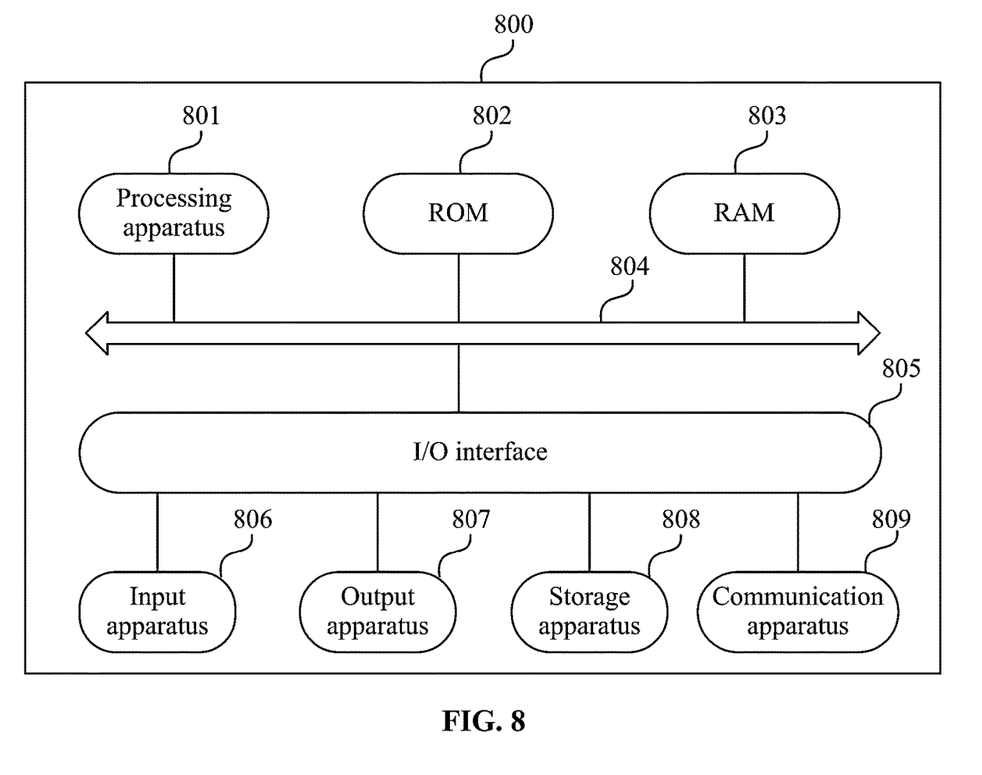
FIG. 8 is a diagram illustrating the structure of an electronic device according to an embodiment of the present disclosure.

FIG. 8 is a diagram illustrating the structure of an electronic device (for example, a terminal device) 800 for implementing any embodiment of the present disclosure. The terminal device in the embodiment of the present disclosure may include mobile terminals such as a mobile phone, a laptop, a digital broadcast receiver, a personal digital assistant (PDA), a portable Android™ device (PAD), a portable multimedia player (PMP), and a vehicle-mounted terminal (for example, a vehicle-mounted navigation terminal) and fixed terminals such as a digital television (TV) and a desktop computer. The electronic device shown in FIG. 8 is an example and is not intended to limit the function and use range of this embodiment of the present disclosure.

As shown in FIG. 8, the electronic device 800 may include a processing apparatus 801 (such as a central processing unit or a graphics processor). The processing apparatus 801 may perform various appropriate actions and processing according to a program stored in a read-only memory (ROM) 802 or a program loaded into a random access memory (RAM) 803 from a storage apparatus 808. The RAM 803 also stores various programs and data required for the operation of the electronic device 800. The processing apparatus 801, the ROM 802, and the RAM 803 are connected to each other through a bus 804. An input/output (I/O) interface 805 is also connected to the bus 804.

The apparatus below may be connected to the I/O interface 805, including an input apparatus 806 such as a touch screen, a touch pad, a keyboard, a mouse, a camera, a microphone, an accelerometer and a gyroscope, an output apparatus 807 such as a liquid crystal display (LCD), a speaker and a vibrator, a storage apparatus 808 such as a magnetic tape and a hard disk, and a communication apparatus 809. The communication apparatus 809 may allow the electronic device 800 to perform wireless or wired communication with other devices to exchange data. Although FIG. 8 shows the electronic device 800 having various apparatuses, it is not required to implement or include all the apparatuses shown. Alternatively, more or fewer apparatuses may be implemented or included.

According to an embodiment of the present disclosure, the process described above with reference to flowcharts may be implemented as a computer software program. For example, a computer program product is included in the embodiment of the present disclosure. The computer program product includes a computer program carried on a non-transitory computer-readable medium. The computer program includes program codes for performing the methods shown in the flowcharts. In such an embodiment, the computer program may be downloaded from a network and installed through the communication apparatus 809, or may be installed from the storage apparatus 808, or may be installed from the ROM 802. When the computer program is executed by the processing apparatus 801, the preceding functions defined in the method of the embodiments of the present disclosure are performed.

The preceding computer-readable medium of the present disclosure may be a computer-readable signal medium or a computer-readable storage medium or any combination thereof. The computer-readable storage medium may be, for example, an electronic, magnetic, optical, electromagnetic, infrared, or semiconductor system, apparatus, or device, or any combination thereof. The computer-readable storage medium may include: an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. The storage medium may be a non-transitory storage medium. In the present disclosure, the computer-readable storage medium may be any tangible medium including or storing a program that can be used by or in connection with an instruction execution system, apparatus or device. In the present disclosure, the computer-readable signal medium may include a data signal propagated on a baseband or as part of a carrier, where computer-readable program codes are carried in the data signal. The data signal propagated in this manner may be in various forms including an electromagnetic signal, an optical signal, or any suitable combination thereof. The computer-readable signal medium may also be any computer-readable medium except the computer-readable storage medium. The computer-readable signal medium may send, propagate or transmit a program used by or in connection with an instruction execution system, apparatus or device. The program codes included in the computer-readable medium may be transmitted in any suitable medium, including a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area networks (WAN), an internet (for example, the Internet), a peer-to-peer network (for example, an Ad-Hoc network), and any network currently known or to be developed in the future.

The preceding computer-readable medium may be included in the preceding electronic device or may exist alone without being assembled into the electronic device.

The computer-readable medium carries at least one program which, when executed by the electronic device, causes the electronic device to display a target page, where target content containing a target object is displayed in the target page; receive a shake trigger operation of a user; and in response to the shake trigger operation, display associated content of the target content in the layer above the target page and display the detail page of the target object after completing displaying the associated content.

Computer program codes for executing the operations of the present disclosure may be written in one or more programming languages or combination thereof, including object-oriented programming languages such as Java™, Smalltalk™, C++, as well as conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the case involving the remote computer, the remote computer may be connected to the user computer through any type of network including a LAN or a WAN, or may be connected to an external computer (for example, via the Internet through an Internet service provider).

Flowcharts and block diagrams among the drawings illustrate the architecture, functionality and operation of possible implementations of systems, methods and computer program products according to various embodiments of the present disclosure. In this regard, each block in the flowcharts or block diagrams may represent a module, program segment or part of codes, where the module, program segment or part of codes includes one or more executable instructions for implementing specified logical functions. In some alternative implementations, the functions noted in the blocks may occur in an order different from that noted in the drawings. For example, two successive blocks may, in practice, be executed substantially in parallel or executed in a reverse order, which depends on the functions involved. Each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The name of a module is not intended to limit the unit itself in a certain circumstance.

The functions described above herein may be executed at least in part by one or more hardware logic components. For example, exemplary types of hardware logic components that may be used include: a field programmable gate array (FPGA), an application-specific integrated circuit (ASIC), application-specific standard parts (ASSP), a System-on-a-Chip (SOC), a complex programmable logic device (CPLD) and the like.

In the context of the present disclosure, a machine-readable medium may be a tangible medium that may include or store a program for use by or in connection with an instruction execution system, apparatus or device. The machine-readable medium may be a machine-readable signal medium or a machine-readable storage medium. The machine-readable medium may include an electronic, magnetic, optical, electromagnetic, infrared, or semiconductor system, apparatus, or device, or any suitable combination thereof. The machine-readable storage medium includes an electrical connection based on one or more wires, a portable computer disk, a hard disk, a RAM, a ROM, an EPROM, a flash memory, an optical fiber, a portable CD-ROM, an optical storage device, a magnetic storage device, or any suitable combination thereof.

According to one or more embodiments of the present disclosure, example one provides an interaction method. The method includes displaying a target page, where target content containing a target object is displayed in the target page; receiving a shake trigger operation of a user; and in response to the shake trigger operation, displaying associated content of the target content in the layer above the target page and displaying the detail page of the target object after completing displaying the associated content.

According to one or more embodiments of the present disclosure, example two illustrates that in the method of example one, the target page includes at least one of a splash page or a video play page.

According to one or more embodiments of the present disclosure, example three illustrates that in the method of example two, the target page includes the video play page, the target content is a target video, and before displaying the target page, the method also includes displaying the splash page and displaying splash content containing the target object in the splash page; and displaying the target page includes, in response to completing displaying the splash content or in response to receiving a first trigger operation acting on a jump control in the splash page, switching the current display page from the splash page to the video play page and playing the target video containing the target object in the video play page.

According to one or more embodiments of the present disclosure, example four illustrates that in the method of example one, displaying the associated content of the target content in the layer above the target page and displaying the detail page of the target object after completing displaying the associated content includes displaying the associated content of the target content in the layer above the target page and switching the target page to the detail page of the target object in the process of displaying the associated content; and in response to completing displaying the associated content, stopping displaying the associated content to display the detail page in the layer under the associated content.

According to one or more embodiments of the present disclosure, example five illustrates that in the method of example four, the associated content includes multiple associated visual elements, and displaying the associated content of the target content in the layer above the target page and switching the target page to the detail page of the target object in the process of displaying the associated content includes filling the display region of the target page with the associated visual elements of the target content; and in response to completing the filling, stopping controlling a new associated visual element to move into the display region and switching the target page to the detail page of the target object.

According to one or more embodiments of the present disclosure, example six illustrates that in the method of example five, filling the display region of the target page with the associated visual elements of the target content includes controlling the associated visual elements of the target content to move from a preset position into the display region of the target page and to continue moving towards the region boundary of the display region until touching the region boundary or until touching an associated visual element that stops moving in the display region.

According to one or more embodiments of the present disclosure, example seven illustrates that in the method of example five or six, in response to completing displaying the associated content, stopping displaying the associated content to display the detail page in the layer under the associated content includes, in response to completing the filling for a preset time length, controlling each of the associated visual elements to move out of the display region to display the detail page in the layer under the associated visual elements.

According to one or more embodiments of the present disclosure, example eight illustrates that in the method of example four, the associated content includes an associated video, and displaying the associated content of the target content in the layer above the target page and switching the target page to the detail page of the target object in the process of displaying the associated content includes playing the associated video of the target content in the layer above the target page and switching the target page to the detail page of the target object in the process of playing the associated video; and in response to completing displaying the associated content, stopping displaying the associated content to display the detail page in the layer under the associated content includes, in response to completing playing the associated video, stopping displaying video frames of the associated video to display the detail page in the layer under the associated video.

According to one or more embodiments of the present disclosure, example nine illustrates that in the method of any one of examples one to four, after displaying the associated content of the target content in the layer above the target page, the method also includes, in response to receiving a second trigger operation acting on the associated content, displaying the detail page of the target object.

According to one or more embodiments of the present disclosure, example ten provides an interaction apparatus. The apparatus includes a target page display module, a shake receiving module, and a detail page display module.

The target page display module is configured to display a target page, where target content containing a target object is displayed in the target page.

The shake receiving module is configured to receive a shake trigger operation of a user.

The detail page display module is configured to, in response to the shake trigger operation, display associated content of the target content in the layer above the target page and display the detail page of the target object after completing displaying the associated content.

According to one or more embodiments of the present disclosure, example eleven provides an electronic device. The electronic device includes at least one processor and a memory configured to store at least one program.

When the at least one program is executed by the at least one processor, the at least one processor performs the interaction method of any one of examples 1 to 9.

According to one or more embodiments of the present disclosure, example twelve provides a computer-readable storage medium storing a computer program which, when executed by a processor, causes the processor to perform the interaction method of any one of examples 1 to 9.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. An interaction method, comprising:
   displaying a video play page, wherein a video containing an object is displayed in the video play page in a video play page layer, wherein the method further comprises:
   receiving a shake trigger operation of a user;
   in response to the shake trigger operation, controlling a plurality of associated visual elements of the video to move from a preset position into a display region of the video play page in a layer above the video play page layer and to continue moving towards a region boundary of the display region until touching the region boundary or until touching an associated visual element that stops moving in the display region; and
   in response to completing the filling, stopping controlling a new associated visual element to move into the display region and switching the video play page to a detail page of the object, and
   in response to completing the filling for a preset time length, controlling each of the plurality of associated visual elements of the video to move out of the display region to display the detail page in the video play page layer under the plurality of associated visual elements of the video, and before displaying the video play page, displaying a splash page including splash content containing the object in the splash page.

2. The method of claim 1, after controlling the plurality of associated visual elements of the video to move from the preset position into the display region of the video play page and to continue moving towards the region boundary of the display region, the method further comprising:
   in response to receiving a trigger operation acting on the plurality of associated visual elements, displaying the detail page of the object.

3. An electronic device, comprising:
   at least one processor; and
   a memory configured to store at least one program,
   wherein the at least one program, when executed by the at least one processor, causes the at least one processor to perform:
   displaying a video play page, wherein a video containing an object is displayed in the video play page in a video play page layer;
   receiving a shake trigger operation of a user;
   in response to the shake trigger operation, controlling a plurality of associated visual elements of the video to move from a preset position into a display region of the video play page in a layer above the video play page layer and to continue moving towards a region boundary of the display region until touching the region boundary or until touching an associated visual element that stops moving in the display region; and
   in response to completing the filling, stopping controlling a new associated visual element to move into the display region and switching the video play page to a detail page of the object, and
   in response to completing the filling for a preset time length, controlling each of the plurality of associated visual elements of the video to move out of the display region to display the detail page in the video play page layer under the plurality of associated visual elements of the video, and before displaying the video play page, displaying a splash page including splash content containing the object in the splash page.

4. A non-transitory computer-readable storage medium storing a computer program which, when executed by a processor, causes the processor to perform:
   displaying a video play page, wherein a video containing an object is displayed in the video play page in a video play page layer;
   receiving a shake trigger operation of a user;
   in response to the shake trigger operation, controlling a plurality of associated visual elements of the video to move from a preset position into a display region of the video play page in a layer above the video play page layer and to continue moving towards a region boundary of the display region until touching the region boundary or until touching an associated visual element that stops moving in the display region; and
   in response to completing the filling, stopping controlling a new associated visual element to move into the display region and switching the video play page to a detail page of the object, and
   in response to completing the filling for a preset time length, controlling each of the plurality of associated visual elements of the video to move out of the display region to display the detail page in the video play page layer under the plurality of associated visual elements of the video, and before displaying the video play page, displaying a splash page including splash content containing the object in the splash page.

* * * * *